United States Patent [19]

Geibel et al.

[11] Patent Number: 5,280,104

[45] Date of Patent: Jan. 18, 1994

[54] PROCESS FOR THE PREPARATION OF POLY(ARYLENE SULFIDE) WITH LOW METAL CONTAMINATION AND POLYMER PRODUCED

[75] Inventors: Jon F. Geibel; Harold D. Yelton, both of Bartlesville, Okla.

[73] Assignee: Phillips Petroleum Company, Bartlesville, Okla.

[21] Appl. No.: 906,783

[22] Filed: Jun. 30, 1992

[51] Int. Cl.$^5$ ............................................. C08G 15/14
[52] U.S. Cl. ............................ 528/388; 528/373; 528/374; 528/389; 528/390; 528/391; 528/397; 528/398; 515/537
[58] Field of Search ............... 528/373, 374, 388, 389, 528/390, 391, 397, 398; 525/537

[56] References Cited

U.S. PATENT DOCUMENTS

| | | | |
|---|---|---|---|
| 4,116,947 | 9/1978 | Edmonds, Jr. et al. | 528/388 |
| 4,745,167 | 5/1988 | Iizuka et al. | 528/388 |
| 4,794,164 | 12/1988 | Iwasaki et al. | 528/388 |
| 4,812,539 | 3/1989 | Iizuka et al. | 528/388 |
| 4,841,019 | 6/1989 | Iwasaki et al. | 528/388 |
| 5,118,786 | 6/1992 | Ostlinning et al. | 528/388 |

OTHER PUBLICATIONS

U.S. application-Ser. No. 810,653.

Primary Examiner—Robert E. Sellers
Assistant Examiner—Helen F. Lee
Attorney, Agent, or Firm—Marianne H. Michel

[57] ABSTRACT

A process for preparing poly(arylene sulfide) with reduced metal contamination is produced by contacting a dihaloaromatic compound, a sulfur source, a polar organic compound, and an alkali metal carboxylate in a reaction vessel wherein at least the liquid contacting parts of the vessel are constructed of titanium. In another aspect of the invention a polymer produced by the above described process is provided.

11 Claims, No Drawings

PROCESS FOR THE PREPARATION OF POLY(ARYLENE SULFIDE) WITH LOW METAL CONTAMINATION AND POLYMER PRODUCED

BACKGROUND OF THE INVENTION

Poly(arylene sulfide)s have become commercially important resins. The products prepared therefrom are finding increasing utility because of their outstanding durability, toughness, chemical inertness, high temperature resistance, and versatility.

In addition, industries such as the electronics industry and the magnetic storage industry require an exceptionally clean polymer, containing very low metal impurities. The use of titanium reactors to reduce metal contamination to moderately low amounts in poly(arylene sulfide) is known. Although metal contamination is reduced in this manner, appreciable amounts of metals remain in the produced polymer, especially titanium, due to corrosion of the titanium reactor.

SUMMARY OF THE INVENTION

It is an object of this invention to provide a process for preparing a poly(arylene sulfide) having very low metal contamination when produced in a titanium vessel.

It is another object of this invention to provide a poly(arylene sulfide) with very low metal contamination.

It is another object of this invention to reduce corrosion in titanium reactors during polymerization of poly(arylene sulfide).

According to the invention, a process for preparing poly(arylene sulfide) with very low metal contamination is provided, which comprises contacting at least one dihaloaromatic compound, at least one polar organic compound, at least one sulfur source, and at least one alkali metal carboxylate in a titanium vessel under polymerization conditions.

In another aspect of the invention, a poly(arylene sulfide) having very low metal contamination is provided.

DETAILED DESCRIPTION OF THE INVENTION

This invention relates to a process for preparing poly(arylene sulfide) having very low metal contamination comprising contacting: (a) at least one dihaloaromatic compound, (b) at least one polar organic compound, (c) at least one sulfur source, and (d) at least one alkali metal carboxylate in a titanium vessel. A polymer with very low metal contamination is produced by the presence of an alkali metal carboxylate in a titanium vessel.

Dihaloaromatic compounds which can be employed in the process of this invention are represented by the formula:

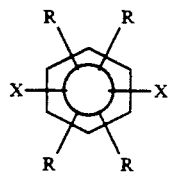

wherein each X is selected from the group consisting of chlorine, bromine, and iodine, and each R is selected independently from the group consisting of hydrogen and hydrocarbyl in which the hydrocarbyl can be an alkyl, cycloalkyl, aryl, or alkaryl radical or combination thereof, the total number of carbon atoms in each molecule being within the range of 6 to 24. While the halogen atoms can be in any position in the dihaloaromatic compound, it is preferred to employ p-dihalobenzenes as the dihaloaromatic compound.

Examples of some dihaloaromatic compounds which can be employed in the process of this invention include p-dichlorobenzene, p-dibromobenzene, p-diiodobenzene, 1-bromo-4-chlorobenzene, 1-chloro-4-iodobenzene, 1-bromo-4-iodobenzene, 2,5-dichlorotoluene, 2,5-dichloro-p-xylene, m-dichlorobenzene, 1-ethyl-4-isopropyl-2,5-dibromobenzene, 1,2,4,5-tetramethyl-3,6-dichlorobenzene, 1,4-dichloro-2-methoxybenzene, 1-butyl-4-cyclohexyl-2,5-dibromobenzene, 1-hexyl-3-dodecyl-2,5-dichlorobenzene, 2-octadecyl-1,4-diiodobenzene, 1-bromo-4-chloro-2-phenylbenzene, 1,4-dibromo-2-(p-tolyl)benzene, 2-benzyl-1,4-dichlorobenzene, 3,5-dichlorobenzoic acid, 1-octyl-4-(3-methylcyclopentyl)-2,5-dichlorobenzene, 1,4-dichloronapthalene, 4,4'-dichlorobiphenyl, 4,4'-dichlorodiphenyl ether, 4,4'-dichlorodiphenyl sulfone, 4,4'-dichlorodiphenyl sulfoxide, 4,4'-dichlorobenzophenone, and mixtures thereof. The preferred dihaloaromatic compound for use in this invention is p-dichlorobenzene due to availability and effectiveness.

Generally, in the preparation of poly(arylene sulfide) polymers, the amount of dihaloaromatic compounds employed is in the range of 0.7 to 2 moles per mole of sulfur source and preferably from about 0.9 to about 1.3. When lesser amounts of dihaloaromatic compounds are used relative to the amount of sulfur source, a sulfur-rich reaction mixture results.

Any suitable sulfur source can be employed in the process of this invention. Suitable sulfur sources are disclosed in U.S. Pat. No. 3,919,177, which is hereby incorporated by reference. Such suitable sulfur sources include but are not limited to thiosulfates, thioureas, thioamides, elemental sulfur, thiocarbamates, metal disulfides and oxysulfides, thiocarbonates, organic mercaptans, organic mercaptides, organic sulfides, alkali metal sulfides and bisulfides, and hydrogen sulfide. If an alkali metal bisulfide or hydrogen sulfide is used, it is preferable that a base, such as an alkali metal hydroxide, is present. Generally the base, if used, will be present in an amount within the range of from about 0.3 to about 4.0 moles of base per mole of sulfur source, preferably from 0.4 to 2.0 moles of base per mole of sulfur source.

It is presently preferred to use an alkali metal sulfide as the sulfur source. Suitable alkali metal sulfides include lithium sulfide, sodium sulfide, potassium sulfide, rubidium sulfide, cesium sulfide, and mixtures thereof. Preferably the alkali metal sulfide is used as a hydrate or as an aqueous mixture. If desired, the alkali metal sulfide can be prepared as an aqueous solution by the reaction of an alkali metal hydroxide with an alkali metal bisulfide. It is preferred to use sodium sulfide or a combination of sodium bisulfide and sodium hydroxide as the sulfur source in this invention, due to effectiveness and availability.

The polar organic compounds useful in the present invention include amides, lactams, ureas, and sulfones. Specific examples of such polar organic compounds include formamide, acetamide, hexamethylphosphoramide, tetramethylurea, N,N'-ethylenedipyrrolidone, N-methyl-2-pyrrolidone (NMP), 2-pyrrolidone, N- ethylpropionamide, N,N-dipropylbutyramide, caprolactam, N-ethylcaprolactam, sulfolane, N,N'-dimethylacetamide, 1,3-dimethyl-2-imidazolidinone, low molecular weight polyamides, and mixtures thereof. Organic amides are preferred. The amides can be cyclic or acyclic and can have 1 to 10 carbon atoms per molecule. N-methyl-2-pyrrolidone (NMP) is especially preferred because of excellent results and ready availability.

The moles of polar organic compound per mole of sulfur source can vary broadly, generally it is from about 1 to 24, preferably from about 2 to 16, and most preferably from 2 to 12 moles of polar organic compound per mole of sulfur source.

Alkali metal carboxylates which can be employed in the process of this invention can be represented by the formula $R'(CO_2)_nM$ where $R'$ is a hydrocarbyl radical selected from alkyl, cycloalkyl, aryl, and alkaryl, said hydrocarbyl radical having 1 to 20 carbon atoms, n is a number from 1-2, and M is an alkali metal selected from the group consisting of lithium, sodium, potassium, rubidium, and cesium. Preferably, $R'$ is an alkyl radical having 1 to 6 carbon atoms, or a phenyl radical, and M is lithium or sodium. If desired, the alkali metal carboxylate can be employed as a hydrate or as a solution or dispersion in water.

Examples of some alkali metal carboxylates which can be employed in the process of this invention include lithium acetate, sodium acetate, potassium acetate, lithium propionate, sodium propionate, lithium 2-methylpropionate, rubidium butyrate, lithium valerate, sodium valerate, cesium hexanoate, lithium heptanoate, lithium 2-methyloctanoate, potassium dodecanoate, rubidium 4-ethyltetradecanoate, sodium octadecanoate, sodium heneicosanoate, lithium cyclohexane carboxylate, cesium cyclododecane carboxylate, sodium 3-methylcyclopentane carboxylate, potassium cyclohexylacetate, potassium benzoate, lithium benzoate, sodium benzoate, potassium m-toluate, lithium phenylacetate, sodium 4-phenylcyclohexane carboxylate, potassium p-tolylacetate, lithium 4-ethylcyclohexylacetate, sodium butanedioate, sodium malonate, sodium glutarate, sodium phthalate, and mixtures thereof. The carboxylate can be prepared in situ by the reaction of the corresponding carboxylic acid with at least one alkali metal hydroxide. The presently preferred alkali metal carboxylate is sodium acetate because of its effectiveness and commercial availability.

The alkali metal carboxylate should be present in the titanium vessel in an amount sufficient to produce poly(arylene sulfide) with very low metal contamination. Generally the moles of alkali metal carboxylate per mole of sulfur source will be within the range of from about 0.05 to about 4, preferably from about 0.1 to about 2, and most preferably from about 0.15 to about 1.5.

Water can be substantially absent at the beginning of the polymerization reaction or it can be present as free water and/or as water of hydration in an amount up to about 1 gram-mole per gram-mole of p-dihaloaromatic.

Polymerization Conditions

Suitable polymerization conditions include a reaction temperature which can vary over a wide range but will generally be within the range of about 170° C. to about 325° C., preferably from 200° C. to 290° C. The reaction time will be within the range of about 10 minutes to about 72 hours and preferably about 1 hour to about 8 hours. The pressure need be only sufficient to maintain the dihaloaromatic compound and the polar organic compound substantially in the liquid phase.

In certain poly(arylene sulfide) preparations, water can be removed in a dehydration step, preferably prior to polymerization, and most preferably prior to contacting with the dihaloaromatic compound. In other poly(arylene sulfide) resin preparations, no dehydration is necessary. In either case it is preferred that no water is added during polymerization, although water may be added at the end of the polymerization step.

The poly(arylene sulfide) polymers can be separated from their reaction mixture by any method known to those of ordinary skill in the art, e.g. by filtration of the polymer. The polymer can then be washed with water and optionally water-miscible solvents such as acetone, methanol, or organic amide in order to remove impurities and by-product salts.

The arylene sulfide polymers can be blended with fillers, pigments, extenders, or other polymers. The polymers can be cured through crosslinking and/or chain extension, e.g., by heating at temperatures up to about 480° C. in the presence of a free oxygen-containing gas, to provide cured products having high thermal stability and good chemical resistance. They are useful in the production of coatings, films, molded objects, and fibers.

The following examples will serve to show the present invention in detail by way of illustration and not by way of limitation.

EXAMPLES

The following examples demonstrate that in the polymerization of dihaloaromatic compounds, the presence of an alkali metal carboxylate reduces metal contamination in poly(arylene sulfide) prepared in a titanium reactor and reduces corrosion of the reactor.

In the following examples, the extrusion rate refers to a flow rate measurement on molten polymer based on ASTM D 1238-82, condition 315/0.345 modified to use an orifice having a length of 1.25 inches and a 5 minute preheat time. The extrusion rate values are reported in units of grams per ten minutes (g/10 min.). Extrusion rate is a specific flow measurement which is particularly useful in characterizing arylene sulfide polymers in the lower molecular weight range.

The poly(phenylene sulfide) (PPS) melt flow values were determined by the method ASTM D 1238-86, Condition 316/5.0, modified to use a preheat time of five minutes. Melt flow values are reported in units of grams per ten minutes (g/10 min).

EXAMPLE I

The polymerization in this example was performed in a titanium autoclave without a carboxylate salt.

A one-liter, titanium autoclave equipped with an anchor stirrer was charged with 47.39 g (0.5 g-mol) sodium hydrosulfide (NaSH) as an aqueous mixture containing 59.149 wt % NaSH, 20.54 g (0.505 g-mol based on 98.3% purity) sodium hydroxide (NaOH), and 148.2 g (1.5 g-mol) N-methyl-2-pyrrolidone (NMP). The autoclave was closed, purged with nitrogen while stirring, and heated for dehydration. When the temperature of the reaction mixture reached 156° C., the dehydration vent line was opened, the temperature fell to approximately 150° C. The dehydration was conducted under a slow purge of nitrogen for 50 minutes, with the final temperature reaching 205° C. Water was received for 40 minutes.

After termination of the dehydration step, 74.24 (0.505 g-mol) of p-dichlorobenzene (DCB) was charged to the autoclave with 24.8 g (0.25 g-mol) of NMP. The mixture was heated to 235° C. and held at that temperature for 1 hour. The mixture was heated to 265° C. and held at that temperature for 2 hours. During the dehydration, 18.62 g of liquid were removed. The liquid from the dehydration was analyzed by GC and shown to contain 17.87 g water.

The autoclave was cooled and the polymer was removed. the polymer product was washed with hot water and dried in a vacuum oven. The polymer yield was 51.1 g or 94.5 percent, based on an assumed quantitative conversion of the limiting reagent, NaSH, to PPS repeating units. The extrusion rate was 48 g/10 min.

EXAMPLE II

Polymerization run 2 was performed in a titanium autoclave using a two step method which does not employ a carboxylate salt.

A one-liter, titanium autoclave equipped with an anchor stirrer was charged with 1.0 g-mol sodium hydrosulfide (NaSH) as an aqueous mixture containing 60.218 wt % NaSH, 1.03 g-mol sodium hydroxide (NaOH), and 4.54 g-mol N-methyl-2-pyrrolidone (NMP). The autoclave was closed, purged with nitrogen while stirring, and heated for dehydration. When the temperature of the reaction mixture reached 162° C., the dehydration vent line was opened and dehydration was carried out under a slow purge of nitrogen for 30 minutes to a final temperature of 210° C. The dehydration operation removed 53 mL of liquid.

After termination of the dehydration step, 1.01 g-mol of p-dichlorobenzene (DCB) was charged to the autoclave with 0.76 g-mol of NMP. The mixture was heated to 210° C. and held at that temperature for 10 hours. At the conclusion of this step, the autoclave was cooled and left overnight.

The next day, 4.0 g-mol distilled water were charged to the autoclave and the mixture was heated to 260° C. and held at that temperature for 10 hours. After the autoclave had been cooled and opened, the contents were mixed with water and removed from the autoclave. This mixture was blended in a blender and sieved on a 200 mesh screen. The solid product was washed in hot deionized water with stirring to remove residual polar organic compound and water soluble by-products. After the solid had been dried in a vacuum oven at 125° C., the product had a melt flow of 274 g/10 min.

EXAMPLE III

Polymerization run 3 was carried out to demonstrate the effect of a carboxylate salt, sodium acetate, to reduce corrosion of the autoclave and to reduce the metal content of PPS made in a titanium autoclave. The same apparatus and essentially the same procedure as in Example I were used except for the changes noted here. A mixture of 93.09 g (1.0 g-mol) NaSH as an aqueous mixture containing 60.218 wt % NaSH, 41.0 g (1.0135 g-mol based on 98.9% purity) NaOH, 250.0 g (2.52 g-mol) NMP, and 26.24 g (0.32 g-mol) of sodium acetate (NaOAc) were charged to the autoclave. A dehydration step was carried out at 160° C. to 210° C. and removed 49 mL of liquid. After the dehydration was complete, 148.47 (1.01 g-mol) DCB and 83.0 g (0.837 g-mol) of NMP were charged to the autoclave, of which about 33.0 g (0.3 g-mol) were used as a flush. The temperature was raised to 235° C. and held for 1 hour. The temperature was raised to 265° C. and held for 3 hours. Examination of the autoclave indicated a definite absence of black corrosion. The polymer product was blended, sieved in a 200 mesh sieve, and washed six times in 80° C. water. The polymer yield was 88.2 g or 81.5 percent. The melt flow was 402 g/10 min.

EXAMPLE IV

Polymerization run 4 was carried out to further demonstrate the effect of sodium acetate to reduce the metal content of PPS made in a titanium autoclave. The same apparatus and essentially the same procedure as in Example I were used except for the changes noted here. A mixture of 95.08 g (1.0 g-mol) NaSH as an aqueous mixture containing 60.218 wt % NaSH, 40.97 g (1.0097 g-mol based on 98.6% purity) NaOH, 247.8 g (2.5 g-mol) NMP and 24.0 g (0.3 g-mol) of sodium acetate (NaOAc) were charged to the autoclave. A dehydration step was carried out at 159° C. to 204° C. and removed 39.35 g of liquid (containing 33.17 g water). After the dehydration was complete, 148.47 g (1.01 g-mol) DCB and 99.13 g (1.0 g-mol) of NMP were charged to the autoclave. The temperature was raised to 235° C. and held for 1 hour. The temperature was raised to 265° C. and held for 3 hours. The polymer product was blended, sieved in a 200 mesh sieve, and washed in hot water. The polymer yield was 95 g. The melt flow was 137 g/10 min.

The results of the polymerization runs are summarized in Table I. All polymers were prepared in a titanium autoclave and the polymer samples were analyzed for titanium contamination. Polymer 1 from Example I, was prepared with no carboxylate present. Polymer 2 was produced using a two step method which does not employ carboxylates. Polymers 3 and 4, were prepared in the presence of sodium acetate. Polymers 3 and 4 prepared in the presence of carboxylate contained less titanium than polymers 1 and 2 prepared without carboxylate.

Titanium analysis was performed by inductively coupled plasma/mass spectroscopy on aqueous nitric acid digests of the ash remaining from pyrolysis of the polymers. Titanium concentrations are reported in parts per million (ppm). The extrusion rate and melt flow values were determined ASTM methods as defined above.

TABLE I

| Run | Acetate Present | Melt Flow g/10 min | Ti ppm |
|---|---|---|---|
| 1 | no | *48 | 24.2 |
| 2 | no | 274 | 8.2 |
| 3 | yes | 402 | 1.8 |
| 4 | yes | 137 | 0.5 |

*Extrusion Rate

The results in Table I demonstrate that the presence of carboxylate reduced the amount titanium found in the polymer by a factor of 4 to as much as a factor of 48.

While this invention has been described in detail for the purpose of illustration it is not to be construed as limited thereby, but is intended to cover all changes and modifications within the spirit and scope thereof.

That which is claimed is:

1. A process for the production of poly(arylene sulfide) comprising:
    contacting the following compounds under polymerization conditions in a vessel wherein liquid contacting parts thereof are constructed of titanium;

(a) at least one dihaloaromatic compound,
(b) at least one sulfur source,
(c) at least one polar organic compound, and
(d) at least one alkali metal carboxylate,
wherein said sulfur source, said alkali metal carboxylate, and said polar organic compound, are contacted prior to contacting with said dihaloaromatic compound.

2. A process according to claim 1 wherein
the moles of said dihaloaromatic compound per mole of said sulfur source is about 0.7 to about 2;
the moles of said polar organic compound per mole of said sulfur source is about 1 to about 24; and
the moles of said alkali metal carboxylate per mole of said sulfur source is about 0.05 to about 4.

3. A process according to claim 2 wherein said dihaloaromatic compound is a p-dihaloaromatic compound;
said sulfur source is selected from the group consisting of alkali metal sulfide, alkali metal bisulfide and hydrogen sulfide; providing further when said sulfur source is said alkali metal bisulfide or hydrogen sulfide, a base is also present;
said polar organic compound is selected from the group consisting of cyclic and acyclic amides having 1 to 10 carbon atoms per molecule; and
said alkali metal carboxylate is represented by the formula $R'(CO_2)_nM$ where $R'$ is a hydrocarbyl radical selected from alkyl, cycloalkyl, aryl, and alkaryl, said hydrocarbyl radical having 1 to 20 carbon atoms, n is a number from 1–2, and M is an alkali metal selected from the group consisting of lithium, sodium, potassium, rubidium, and cesium.

4. A process according to claim 3 wherein
the moles of said p-dihaloaromatic compound per mole of said sulfur source is about 0.9 to about 1.3;
the moles of said polar organic compound per mole of said sulfur source is about 2 to about 16; and
the moles of said alkali metal carboxylate per mole of said sulfur source is about 0.1 to about 2.

5. A process according to claim 4 wherein said polymerization conditions comprise a temperature of from 170° C. to 325° C.; for a time within the range of about 10 minutes to 72 hours; and
a pressure sufficient to maintain the polar organic compound and the dihaloaromatic compound substantially in the liquid phase.

6. A process according to claim 5 wherein no water is added during polymerization.

7. A poly(arylene sulfide) produced by the process of claim 1.

8. A process for the production of poly(phenylene sulfide) comprising:
contacting the following compounds in a vessel wherein the liquid contacting parts of said vessel are constructed of titanium;
(a) p-dichlorobenzene,
(b) sodium bisulfide,
(c) sodium hydroxide,
(d) N-methyl-2-pyrrolidone, and
(e) sodium acetate;
wherein said contacting is at a temperature of 200° C. to 290° C., a pressure sufficient to maintain said p-dichlorobenzene and said N-methyl-2-pyrrolidone in a liquid phase, and for a period of 1 hour to 8 hours;
wherein the moles of said p-dichlorobenzene per mole of said sodium bisulfide is about 0.9 to about 1.3;
wherein the moles of N-methyl-2-pyrrolidone per mole of said sodium bisulfide is 2 to 12;
the moles of said sodium hydroxide per mole of said sodium bisulfide is 0.4 to 2.0;
the moles of said sodium acetate per mole of said sodium bisulfide is about 0.15 to about 1.5; and
wherein said sodium bisulfide, said sodium hydroxide, said sodium acetate, and said N-methyl-2-pyrrolidone are contacted prior to contacting with said p-dichlorobenzene.

9. A process according to claim 1 further comprising a dehydration step.

10. A process according to claim 9 wherein said dehydration step is conducted prior to contacting with said p-dichlorobenzene.

11. A poly(phenylene sulfide) produced by the process of claim 8.

* * * * *